United States Patent [19]

Rauch et al.

[11] Patent Number: 5,017,631
[45] Date of Patent: May 21, 1991

[54] METHOD FOR MAKING A SPRAY DRIED EMULSION POLYMER

[75] Inventors: Hubert Rauch, Weiterstadt; Peter J. Arndt, Seeheim-Jugenheim; Wolfgang Klesse, Mainz; Wilhelm Krall, Darmstadt; Klaus Frank, Muehltal, all of Fed. Rep. of Germany

[73] Assignee: Röhm GmbH, Darmstadt, Fed. Rep. of Germany

[21] Appl. No.: 462,274

[22] Filed: Dec. 26, 1989

Related U.S. Application Data

[62] Division of Ser. No. 202,134, Jun. 2, 1988, abandoned.

[30] Foreign Application Priority Data

Jun. 6, 1987 [DE] Fed. Rep. of Germany ....... 3719241

[51] Int. Cl.$^5$ ................................. C08K 3/00
[52] U.S. Cl. .................... 523/340; 523/342; 524/297
[58] Field of Search ................................. 523/340, 342

[56] References Cited

U.S. PATENT DOCUMENTS 4,071,653 1/1978 Boessler et al. .................. 428/332

FOREIGN PATENT DOCUMENTS

| 0565819 | 6/1989 | Australia . |
| 11094719 | 1/1981 | Canada . |
| 1256645 | 6/1989 | Canada . |
| 0149098 | 7/1985 | European Pat. Off. . |
| 0154189 | 9/1985 | European Pat. Off. . |
| 2543542 | 4/1977 | Fed. Rep. of Germany . |
| 12346379 | 10/1977 | France . |

OTHER PUBLICATIONS

Polymer Handbook, Brandrup and Immergut, 2d edn., John Wiley & Sons, New York, pp. III-51, III-89, III--144, III-155.
Encyclopedia of Polymer Science and Engineering, vol. 12, John Wiley & Sons, New York, 1988, p. 53.
The Merck Index, Merck & Col., Inc., Rahway, NJ, pp. 983, 984.

Primary Examiner—Joseph L. Schofer
Assistant Examiner—Peter D. Mulcahy
Attorney, Agent, or Firm—Curtis, Morris & Safford

[57] ABSTRACT

Powders of an emulsion polymer having reduced fines and exhibiting low dusting are made by spray drying an emulsion of a polymer having a Vicat softening temperature above 60° C., said emulsion containing an external plasticizer having a boiling point of at least 150° C.

2 Claims, 3 Drawing Sheets

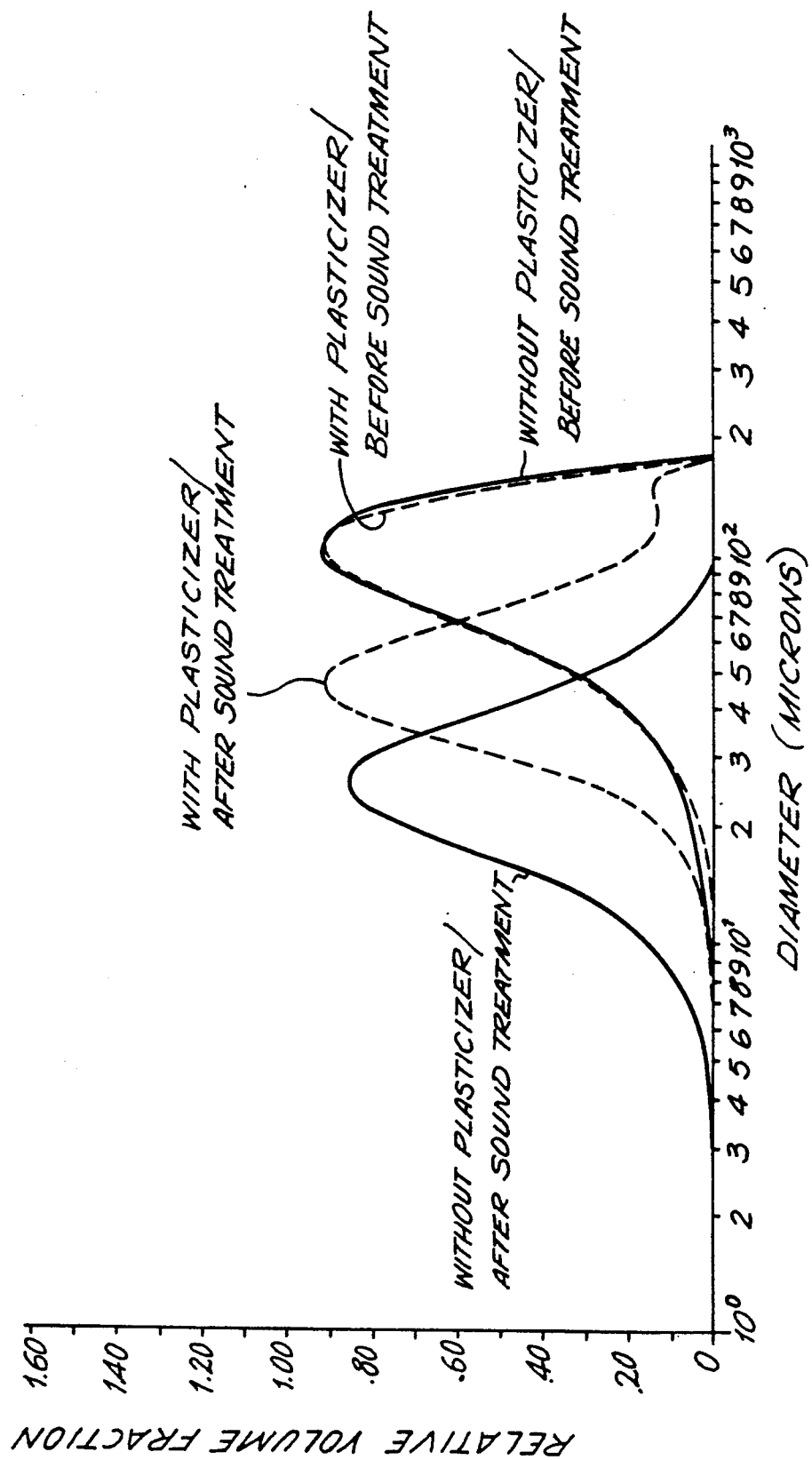

FIG. 2 EX.1 - PARTICLE SIZE DISTRIBUTION WITHOUT PLASTICIZER
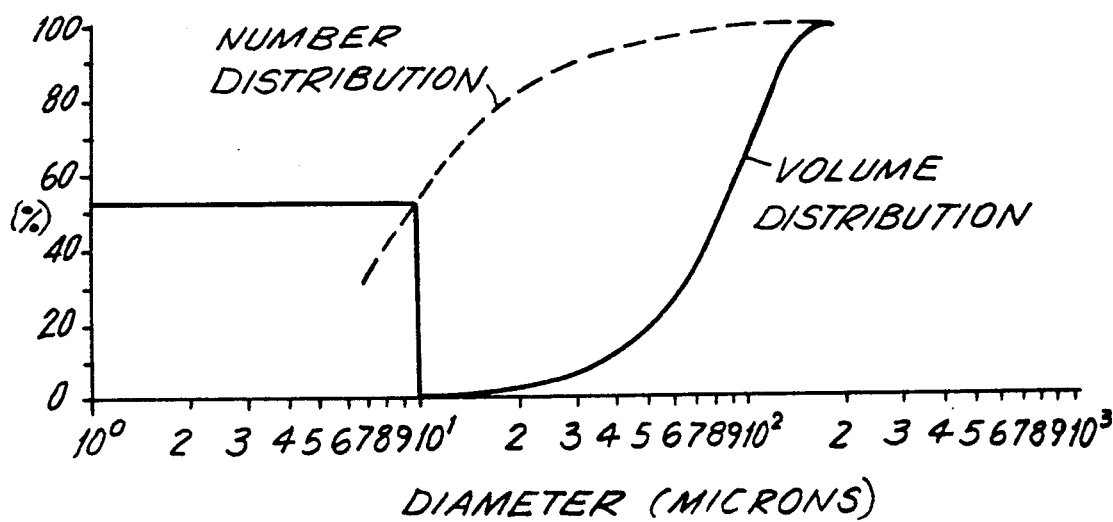
FIG. 3 EX.1 - PARTICLE SIZE DISTRIBUTION WITH PLASTICIZER
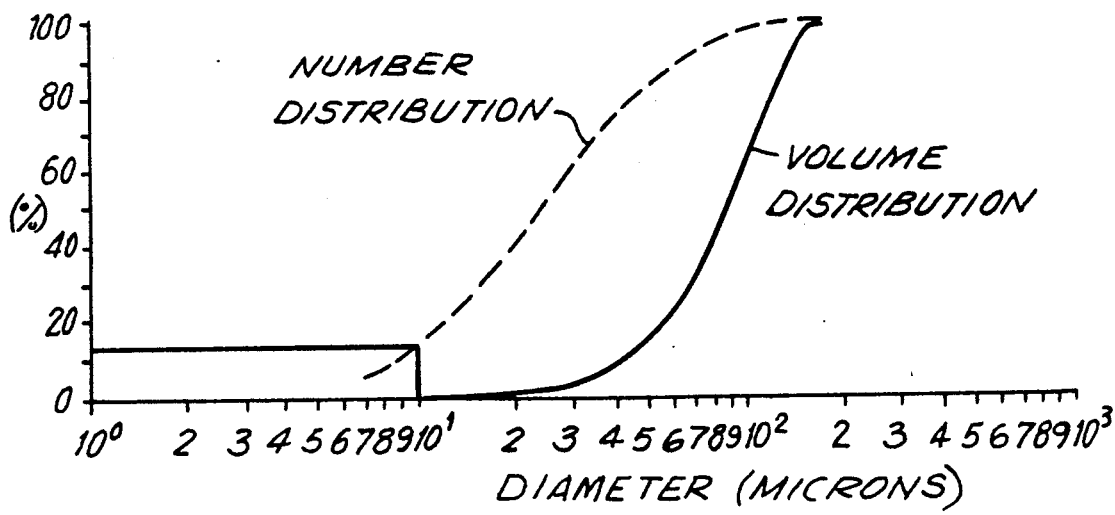

FIG. 4  EX. 2 - PARTICLE SIZE DISTRIBUTION WITHOUT PLASTICIZER
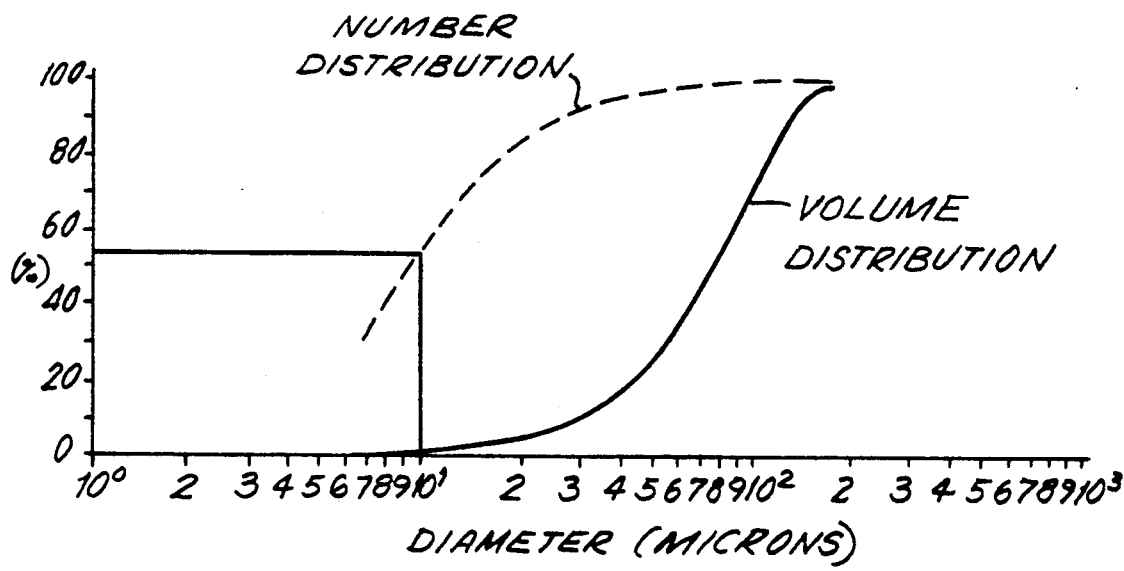
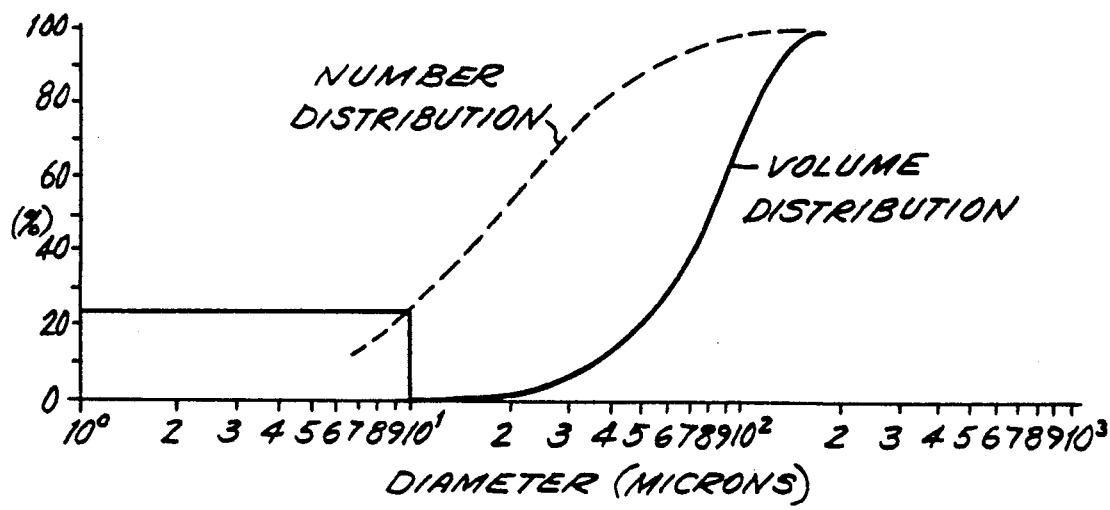
FIG. 5  EX. 2 - PARTICLE SIZE DISTRIBUTION WITH PLASTICIZER

METHOD FOR MAKING A SPRAY DRIED EMULSION POLYMER

This is a divisional application of application Ser. No. 07/202,134 filed June 2, 1988 and now abandoned.

The present invention relates to a polymer in the form of powder grains consisting essentially of aggregated latex particles of an emulsion polymer having a Vicat softening point above 60° C. and an external plasticizer compatible with said polymer and having a boiling point above 150° C., and to a method for making such polymer powder grains by spray drying.

THE PRIOR ART

Spray dried emulsion polymer powders are known in the art. They often have a very low softening temperature and are mixed with anticaking agents to prevent the powder particles from sticking together upon storage. (See German patent 33 44 242.) German patent 26 14 261 describes powders of this type produced from an aqueous dispersion of an emulsion polymer having a minimum film forming temperature (MFT) above 0° C. To impart to the polymer the softness required by its end use, sufficient plasticizer is added to it to bring the MFT down to 0° C. and a powder is then produced by spray drying. In this case too, the powder particles are prevented from sticking together by the addition of a water soluble agent having a glass transition temperature above 60° C.

In contrast to these soft powders, the present invention relates to hard emulsion polymers having a Vicat softening point above 60° C.

The spray drying of such emulsion polymers is also known. For example, according to German patent 26 29 924, aqueous dispersions of emulsion polymers having an MFT in the range from 20° C. to 80° C. are spray dried with the addition of a wax to form a redispersible powder. Upon redispersing, plasticizers may be used concurrently. Certain plasticizing additives such as caprolactam may also be contained in the spray-dried powder. The properties of the spray-dried powder are decisively influenced by the presence of the wax, which exerts a bonding action on the latex particles contained in the powder particles.

In contrast thereto, the inventive powders substantially consist solely of aggregated latex particles of the emulsion polymer, which has a Vicat softening point of over 60° C. In other words, they contain no constituents, apart from the latex particles, present in such an amount that they would affect the physical properties of the particles, such as their strength or their porosity. Among the secondary constituents which are present in minor amounts but have no perceptible influence on the properties of the powder particles are the auxiliary agents in the underlying latex, such as emulsifiers or salts.

Typical spray-dried emulsion polymers of this type are the PVC processing aids known from German patent 21 01 808. They consist of a powder whose grains are composed of loosely aggregated fine particles. This particle structure is obtained by carrying out the spray drying of the underlying aqueous dispersion of the emulsion polymer at a relatively low outlet air temperature so that the latex particles in the individual droplets or powder particles are not heated to such a degree that they would sinter or fuse together. The loose fine structure has a favorable effect on the processing properties of the PVC processing aids. However, it does have the drawback that a substantial fraction of extremely fine powder particles is produced. Since this fine fraction cannot be completely held back in the cyclone separator of the spray-drying unit, it results in yield losses and in pollution of the atmosphere by the polymer dust given off. The handling of the powdered product can also entail objectionable dusting.

While these drawbacks can be avoided simply by raising the temperature in the spray-drying unit so that the latex particles in the powder grains fuse together, this will reduce their decomposability on being mixed into PVC molding compositions. It is extremely difficult to control the temperature in the spray-drying unit with such precision that the latex particles in the powder grains will sinter together exactly to the point where no difficultly separable fines are produced and where no dust-forming attrition occurs in handling, while on the other hand the particles are decomposed rapidly and completely as they are being incorporated in PVC molding compositions.

According to German patent 34 05 651, spray-dried emulsion polymers with a reduced content of fines are obtained from bimodal synthetic-resin dispersions. A further reduction of the fines content is desirable also with these powders.

THE OBJECT AND THE INVENTION

Thus there has been a need to develop and to produce in high yield a spray-dried emulsion polymer in the form of a powder consisting of grains which are substantially composed solely of aggregated latex particles of an emulsion polymer which in the pure state has a Vicat softening point of over 60° C. in a nondusting but readily decomposable form. The invention does not extend to spray-dried emulsion polymers of this type in which the powder grains contain, in addition to the latex particles, appreciable amounts of other constituents, such as waxes or oil, which exert a binding action on the latex particles and prevent the objectionable dust formation only that way.

It has been found that the spray-dried emulsion polymer will possess the required properties if the latex particles contained in the powder grains incorporate an effective amount of a high-boiling plasticizer that is compatible with the emulsion polymer. The plasticizer is not present as a separate phase along with the latex particles but is dissolved in the emulsion polymer itself.

FIGS. 1 to 5 show differential or integral particle-size distribution curves of the inventive powders compared to prior-art powders.

For the decomposability of the spray-dried emulsion polymer it is essential that the latex particles of the emulsion polymer be preserved in aggregated form in the powder grains. However, the object of the invention is not fully accomplished if the latex particles loosely adhere to one another solely due to surface forces and can be separated from one another even by very weak mechanical forces. On the other hand, the latex particles should not be completely fused together to form a glassy mass that appears translucent under the microscope. Rather, the latex particles should be sintered or welded only in spots to the adjacent particles within the same powder grain. Under the microscope, the powder particles appear as a white or slightly translucent mass. On being crushed, the particles offer practically no perceptible resistance to their being broken down and can be smeared onto a solid substrate as a level coating.

While a uniform state of incipient melting of the individual latex particles can only be achieved over an extremely narrow temperature range in spray drying in the absence of a plasticizer, the range over which the desired state of sintering is obtained can be readily established in the spray drying of a dispersion containing a plasticizer. Surprisingly, the addition of just one percent or of just a few percent of a plasticizer will increase the yield in spray drying by as much as ten percent or more. Still more surprisingly, the decomposability of the powder is better than that of a powder containing no plasticizer and forming much dust, although the more pronounced melting might have seemed to indicate that it would be more difficult to bring about decomposition. In processing a clear PVC molding composition with a powder containing no plasticizer, for example, still undecomposed particles or streaks are discernible in many cases after inadequate plasticization. Under identical processing conditions, the inventive powders result in fewer flaws of this type, if any.

PRACTICE OF THE INVENTION

The invention is not limited to PVC processing aids, although these are of primary interest. Similar troubles, such as yield losses, pollution of the environment, and the nuisance posed by dust, can arise with any spray-dried emulsion polymer whose powder grains consist of loosely aggregated latex particles, in other words, of latex particles which are not fused together to form a hard mass. They offer the advantage that they dissolve more rapidly in organic solvents than do fused particles, and that with plasticizers they give homogeneous plastisols or thermogelled coatings, as for pharmaceutical products, for example.

Thus, any emulsion polymer can be used which has a Vicat softening point of over 60° C., and preferably over 80° C., and which can be utilized to advantage in the form of the described powders. The Vicat softening point is determined in conformity with DIN 53460. The temperature of the damping maximum in the torsional vibration test ($T_g$ dyn, in conformity with DIN 53445), which is above 80° C., may also be utilized for characterization of the emulsion polymer.

Typical emulsion polymers having a Vicat softening point above 60° C. comprise more thant 50, and preferably from 70 to 100, percent by weight of ethylenically mono-unsaturated monomers giving hard homopolymers and of less than 50, preferably from 0 to 30, percent by weight of ethylenically mono-unsaturated comonomers giving soft homopolymers. By hard homopolymers are meant those having a Vicat softening point above 60° C., and by soft homopolymers are meant those with a Vicat softening point below 60° C. Examples of monomers of the first kind are methyl-, ethyl-, isopropyl-, t.-butyl-, and cyclohexyl-methacrylate, styrene, vinyltoluene, $\alpha$-methyl styrene, acrylonitrile and methacrylonitrile, acrylic acid and methacrylic acid, maleic and itaconic acids, and vinyl chloride. Illustrative of monomers of the second kind are the alkyl esters of acrylic acid and the $C_3$ and higher alkyl esters of methacrylic acid, vinyl acetate, olefins, and vinyl alkyl ethers. Particularly preferred polymers according to the present invention are those comprising 70 to 100 percent by weight of a member selected from the group consisting of methyl methacrylate and styrene, 0 to 20, and more preferably 2 to 20, percent by weight of a member selected from the group consisting of alkyl acrylates and alkyl methacrylates other than methyl methacrylate, and 0 to 20 percent by weight of a member selected from the group consisting of vinyl monomers different from those mentioned above.

Known emulsion polymers of this type which are produced and used as spray dried powders include:

(1) PVC processing aids according to German patent publication 21 01 808 which contain copolymers composed of 70 to 95 percent of methyl methacrylate and from 30 to 5 percent of comonomers giving soft homopolymers, and particularly $C_1$–$C_8$ alkyl acrylates, having a reduced viscosity between 200 and 1000 ml/g;

(2) powdered binders for the production of coatings for pharmaceutical products according to German patent publication 25 12 238 (=U.S. Pat. No. 4,112,215) and German patent 30 49 179 (=U.S. 4,433,076), composed of copolymers of water soluble monomers, such as unsaturated mono- and di-carboxylic acids, aminoalkyl esters and aminoalkylamides of such acids, their hydroxyalkyl esters and amides, vinylpyrrolidone or vinylimidazole, and water insoluble monomers such as styrene, vinyl acetate, olefins, and $C_1$–$C_{10}$ alkyl esters of acrylic or methacrylic acid;

(3) redispersible powders for the production of coating dispersions for pharmaceutical products according to German patent 32 08 791 (=U.S. Pat. No. 4,520,172) or German patent 34 38 291 (=U.S. Pat. No. 4,737,357), which contain copolymers of 15 to 80 percent of monomers which form salts in the acid or alkaline range, such as unsaturated carboxylic acids or aminoalkyl esters of amides of such acids, or from 5 to 20 percent of monomers with a quaternary ammonium salt group, the balance being made up of water insoluble comonomers such as alkyl esters of acrylic acid or of methacrylic acid; and (4) polymer powders for the preparation of plasticizer-containing plastisols according to German patent publication 25 43 542 (=U.S. Pat. No. 4,071,653) and U.S. Pat No. 4,199,486, composed of more than 50 percent of methyl methacrylate and a basic comonomer such as vinylimidazole, or of a core/shell emulsion polymer, the core consisting at least in part of acrylic esters or higher methacrylic esters and the shell of more than 50 percent of methyl methacrylate.

To the extent that the patent publications cited also describe polymers having a Vicat softening point of less than 60° C., the use of the present invention is indicated only with those having a Vicat softening point above 60° C., and more particularly over 80° C., because it is only with these polymers the the dusting problems described are encountered. These problems bevome more severe as the Vicat softening point increases. Emulsion polymers which are typical for the invention have Vicat softening points ranging from 70° C. to 150° C., and more particularly from 80° C. to 130° C.

The molecular weights of the emulsion polymers depend as usual on the requirements of a given end use. For example, the molecular weight (weight-average) of an emulsion polymer to be used as a PVC processing aid may range from 500,000 to several million, and more particularly from 0.7 to 4 million, as determined by gel permation chromatography.

The size of the latex particles is not critical, provided that sprayability is assured. Very fine dispersions with a high solids content are viscous and difficult to spray. Coarse dispersions, and especially those with a narrow particle-size distribution, occasionally cause difficulties in spraying because of extremely high sensitivity to shear stresses. The optimum particle size for the emulsion polymers to be used in accordance with the invention ranges from 0.08 to 1 micron, and more particularly from 0.1 to 0.5 micron. The viscosity of the dispersion used in spray drying is advantageously less than 5,000 mPa·s, and preferably less than 1,000 mPa·s, which is usually the case with solids contents under 60 weight percent and particle sizes over 0.3 micron. Finer dispersions require a lower solids content, for example, from 30 to 50 percent. Bimodal dispersions can be readily sprayed even when they have a relatively high solids content, and they give good yields and low fines contents.

The high-boiling plasticizer which in accordance with the invention is contained in the spray-dried emulsion polymer has the function of slightly softening during the spray-drying process the latex particles present in a latex droplet or powder grain so that they will weld or sinter together at their points of contact. To fulfill this function, the plasticizer must not volatilize under the conditions prevailing in the spray dryer. In accordance with the invention, therefore, a plasticizer is used which boils under normal pressure at a temperature higher than that at which the spray dried emulsion polymer is separated from the air stream. The boiling point is suitably above 150° C., preferably above 200° C. Non-volatile plasticizers which decompose below their normal boiling points, but above 150° C. or 200° C., may also be used.

It is essential that the plasticizer be compatible with the emulsion polymer at least at the temperature prevailing in the dryer. Such compatibility exists if the dried emulsion polymer dissolves in an excess of the plasticizer or swells therein to such a degree that optically the mixture appears substantially homogeneous and clear. It will suffice for such homogeneity to set in only after a prolonged time, for example, 24 hours, and after heating to the outlet temperature.

The substances suited for use as plasticizers do not form a chemically uniform class of substances. Characteristically, they possess the compatibility mentioned above and have a melting point that is below the outlet temperature. The melting point is preferably less than 20° C. The polar nature of the plasticizer should of course approximate that of the emulsion polymer. Suitable for the nonpolar emulsion polymers composed predominantly of methyl methacrylate which lend themselves to use as PVC processing aids are similarly nonpolar plasticizers such as dibutyl phthalate, dioctyl phthalate or other alkyl esters of phthalic acid, adipic acid or sebacic acid, chlorinated paraffins, trialkylphosphates, aliphatic or araliphatic polyesters, etc. In principle, any plasticizer that is suitable also for polyvinyl chloride can be used. In view of its outstanding commercial importance, the group of phthalate plasticizers deserves special mention. A detailed description of suitable plasticizers will be found in "Kunststoff-Handbuch" (Plastics Handbook) by H. K. Felger, 2nd ed. (1985), vol. 2/1, pp. 609–659; Carl Hanser Verlag.

The same plasticizers are also suitable for the spray-dried emulsion polymers usable in PAMA plastisols.

A number of the plasticizers suitable for this purpose are listed in German patent publication 25 43 542 (=U.S. Pat. No. 4,071,653).

Considerably more polar plasticizers are required for emulsion polymers which are partly composed of hydrophilic monomers and are used for the preparation of coatings for pharmaceutical products, for example. These include ethyl esters and other lower alkyl esters of citric acid, and polyethylene glycols with molecular weights between 200 and 6,000, fatty acid esters of sugar alcohols or their ethoxylation products, such as (optionally ethoxylated) sorbitan monooleate.

The amount of the plasticizer should be such that the desired effect is achieved. When too little plasticizer is used, dust formation will not be sufficiently suppressed. When too much plasticizer is used, a deposit from the polymer may build up in the spray dryer. The effective amount naturally depends on the hardness or Vicat softening point of the emulsion polymer. If the latter is close to 60° C., less plasticizer will generally be needed than if it is 120° C. or higher. On the other hand, the amount of plasticizer within the effective range has been found to be quite uncritical. For example, in many cases no appreciable difference in effect has been observed between additions ranging from 1 to 5 weight percent. As a rule, the effective range will be from 0.5 to 20 weight percent, and the preferred range from 1 to 8 weight percent, based in each case on the weight of the polymer.

The plasticizer may be incorporated into the emulsion polymer in different ways. It may be added to the finished dispersion, which then is stirred or allowed to stand until the plasticizer has been absorbed by the emulsion polymer. However, it will be simpler to incorporate the plasticizer into the dispersion as the latter is being prepared. For example, the plasticizer may be emulsified in the water phase, introduced first so that it will mix with the monomer phase being added and will be absorbed by the latex particles even as they are being formed. In emulsion polymerization by the gradual addition method, it is advisable to mix the plasticizer wth the monomer phase being gradually added.

Spray drying is carried out conventionally. On a commercial scale, tall spray dryers are employed through which hot air usually flows from top to bottom co-currently with the dispersion being fed in. The latter is atomized by being forced through one or more nozzles, or preferably by means of a rapidly rotating apertured disk. The entering hot air has a temperature between 100° C. and 250° C., preferably between 150° C. and 250° C. The air temperature decreases to about 50° C. to 90° C. on its path to the outlet as a result of heat consumed by the evaporation of water from the latex droplets. The temperature of the latex droplets always remains below the outlet temperature of the air because the droplets are cooled by evaporation of the water therein. Thus, they are always colder than the surrounding air.

The properties of the spray dried emulsion polymer are determined by the outlet air temperature, that is the temperature at which the dried powder grains are separated from the air stream at the base of the spray dryer or in a cyclone separator. Whenever possible, that temperature should be lower than the temperature at which the emulsion polymer, if free of plasticizer, would sinter or melt. In many cases, an outlet temperature from 40° C. or 50° C. to 90° C. will be quite appropriate. With a constant air stream, the outlet temperature can be controlled by variation of the amount of dispersion continuously injected in unit time. When the amount of plasticizer and the temperature control in the dryer are optimally adjusted, a weakly sintered state will be achieved in the individual powder grains in which the latex particles are bonded firmly enough so that they will not undergo attrition with dust formation while on the other hand the bond will be sufficiently loose to permit the powder to be dissolved readily and rapidly or to be uniformly dispersed in a polyvinyl chloride melt.

The slight sintering of the latex particles within the powder grains manifests itself in several ways. The higher yield in spray drying is due to the reduced fraction of fines that cannot be completely separated from the air stream of the spray-drying unit and thus is partly lost. For the same reason, the handling of the powder in packaging, for example, entails much less dusting. This effect is usually apparent even without measurements of any kind. For example, when a powder flask filled with 30 g of powder is opened shortly after its content has been shaken up, a visible cloud of dust will escape if the powder contains no plasticizer, while the inventive powder will not give rise to any dust cloud, or then only a faint one. The pronounced dust formation in the former case can be observed even inside the powder flask; the dust will only settle after 10 to 20 seconds and will leave a noticeable deposit on the glass walls. The inventive powder incorporating a plasticizer, on the other hand, will settle within just a few seconds and will not leave a dust film on the glass walls.

The reduced dusting is a lasting effect. While a powder containing no plasticizer will give off steadily more fines through abrasion when moved mechanically, this effect is but slight with the powder of the invention. The stability of the powder grains under mechanical stress can be rendered visible by means of an ultrasonic treatment. To this end, 600 ml of a highly diluted aqueous suspension of the powder in water was exposed in an 800-ml beaker for 10 seconds in an ultrasonic bath (Sonorex TK 52, manufactured by Bandelin) to ultrasonic irradiation at a radio frequency of 40 kHz and a radio-frequency power output of 50-100 watts. Before and after, the particle-size distribution was determined by measuring the absorbance of a suspension of the powder grains in water flowing through the measuring cell. (Measuring instrument: Kratel Partoskop F, manufactured by Kratel GmbH, Göttingen.) FIG. 1 shows the differential particle-size distribution before and after the ultrasonic treatment. Before the ultrasonic treatment, the maxima of the distribution curves of the plasticizer-free powder and of the plasticizer-containing powder of Example 1 have the same value; however, the latter maximum shows a smaller fine fraction. The fraction of fines (particles of less than 10 microns) after the ultrasonic treatment is 15 volume percent for the powder without plasticizer and less than 1 volume percent for the powder with plasticizer. From the shift in the maxima, particle degradation is apparent in both cases; but in the case of the inventive plasticizer-containing powder it is significantly less pronounced.

According to German Research Association Bulletin XIX on "Maximum Concentrations and Threshold Limit Values for Substances in Workroom Air" of 1983, the important factor in an evaluation of dust behavior is the proportion of powder particles of a size of less than 10 microns. Particles of this size are capable of penetrating into the alveoli during inhalation and can cause damage. This is why the reduction of fine-dust formation is of major importance from the standpoint of industrial hygiene.

Though the numerical fraction of fines in powders containing no plasticizer is often greater than 50 percent, it can be reduced to values of less than 30 percent, and occasionally of less than 20 percent, by the addition of 5 percent of a plasticizer. As is apparent from FIGS. 2 to 5, the volume fraction of the fines often does not reveal their high numerical proportion.

The effect of the plasticizer addition is illustrated below in a few polymer examples. In the absence of plasticizers, the emulsion polymers used had the following properties:

(A) Composition: 95 Percent methyl methacrylate, 5 percent ethyl acrylate. Vicat softening point: 108° C. Shear modulus at 20° C.: 1600 N/mm.

(B) Composition: 88 percent methyl methacrylate, 12 percent butyl acrylate. Vicat softening point: 105° C. Shear modulus at 20° C.: 1400 N/mm.

(C) Composition: 75 percent methyl methacrylate, 25 percent butyl methacrylate. Vicat softening point: 90° C. Shear modulus at 20° C.: 1300 N/mm The table which follows shows, on the basis of the powder yield in spray drying in a pilot spray-drying unit and of the properties of an extruded mixture of 97 percent polyvinyl chloride and 3 percent of the polymers (A), (B) and (C), the advantageous effects of the inventive addition of dioctyl phthalate as a plasticizer, partly to the emulsion-polymer formulation (EPF), partly to the monomer emulsion (ME) being continuously added, and partly to the completely polymerized dispersion (D). Moreover, the values of the Vicat softening point and of the shear modulus at 20° C. show the effects of the plasticizer addition on the thermal properties of the polymers.

TABLE

| Polymer | Plasticizer Wt. % | Added to | Powder yield, % | Characteristics of extrudate | Vicat softening point, °C. | Shear modulus, N/mm² |
|---|---|---|---|---|---|---|
| A | 0 | — | 88.3 | Unsteady, slight streaks | 108 | 1600 |
| A | 1 | ME | 93.3 | Improved overall | 104 | 1500 |
| A | 5 | ME | 96.5 | " | 96 | 1500 |
| A | 5 | D | 97.7 | " | 93 | 1500 |
| B | 0 | — | 85.2 | Unsteady, slight streaks | 105 | 1500 |
| B | 1 | EPF | 97.4 | Improved overall | 104 | 1400 |
| B | 1 | ME | 98.2 | " | 103 | 1350 |
| B | 5 | ME | 98.0 | " | 95 | 1300 |
| B | 5 | EPF | 98.5 | " | 96 | 1300 |
| C | 0 | — | 92.2 | Unsteady; slight streaks | 90 | 1300 |
| C | 1 | ME | 97.9 | Improved overall | 87 | 1200 |
| C | 5 | ME | 97.1 | " | 72 | 1175 |
| C | 5 | D | 98.0 | " | 73 | 1175 |

EXAMPLES

Example 1

In a stainless-steel reaction vessel with a capacity of 100 liters, equipped with reflux condenser, stirrer and feed vessel, 2 g of ammonium persulfate and 12 g of $C_{15}$ paraffin sulfonate (trade name "Emulgator K 30" of Bayer AG) are dissolved at 80° C. in 16 kg of distilled water. To this solution there is added dropwise at 80° C. over a period of 4 hours with stirring an emulsion previously prepared from 38 kg of methyl methacrylate, 2 kg of ethyl acrylate, 90 g of the aforesaid emulsifier, 18 g of ammonium persulfate and 23 kg of distilled water. The batch is maintained at 80° C. for 2 hours, cooled to room temperature, adjusted to pH 10.0 with dilute caustic-soda solution, and filtered through a fine-mesh woven-wire screen.

A coagulate-free dispersion with a solids content of 51% and a viscosity of 490 mPa·s is obtained. The average particle diameter is 250 nm. The reduced viscosity (measured at 20° C. in chloroform) is 257 ml/g. Weight average $MW = 1.4(10^6)$.

Half of the dispersion is then mixed with 1 kg of dioctyl phthalate, which is stirred in as an aqueous emulsion.

The two halves of the dispersion are separately atomized in a spray dryer by means of a disk atomizer and dried cocurrently with air of 160° C. The quantitative ratio of dispersion to air is such that the material being spray-dried leaves the dryer at an outlet air temperature of 75° C. as a dry powder. The aggregates comprise partly sintered or fused particles.

The particle-size distribution in the two powders obtained is then determined. It is shown graphically in FIGS. 2 and 3. Characteristic values are:

|  | Without plasticizer | With 5% plasticizer |
| --- | --- | --- |
| Volume fraction of particles of less than 10 microns, approximately | 1% | 0% |
| Numerical fraction of particles of less than 10 microns, approximately | 53% | 13% |

Example 2

In a stainless-steel reaction vessel with a capacity of 100 liters, equipped with reflux condenser, stirrer and feed vessel, 20 g of sodium sulfate, 2 g of potassium persulfate, 0.2 kg of dry ice, and 60 g of paraffin sulfonate (trade name Emulgator K 30 of Bayer AG) are dissolved at 80° C. in 16 kg of water. To this solution there is added dropwise at 80° C. over a period of 3 hours with stirring an emulsion previously prepared from 30 kg of methyl methacrylate, 10 kg of butyl methacrylate, 2 kg of dioctyl phthalate, 88 g of the aforesaid emulsifier and 25 kg of water. The batch is maintained at 80° C. for another 2 hours and then cooled to room temperature. Then 20 g of sodium sulfate is added to it and it is filtered through a fine-mesh woven-wire screen.

A coagulate-free dispersion with a solids content of 51.2% and a viscosity of 595 mPa·s is obtained. The average particle diameter is 166 nm. The reduced viscosity of the polymer is 500 ml/g. Weight average $MW = 2.5(10^6)$.

For comparison, a second batch is prepared without the dioctyl phthalate component of the monomer emulsion. The solids content in this case is 50.2%, and the viscosity, 510 mPa·s. The particle size (170 nm) and the reduced viscosity (514 ml/g) are practically unchanged.

Both dispersions are spray-dried as in Example 1. The particle-size distribution in the powders obtained is then determined. It is shown graphically in FIGS. 4 and 5. Characteristic values are:

|  | Without plasticizer | With 5% plasticizer |
| --- | --- | --- |
| Volume fraction of particles of less than 10 microns, approximately | 1% | 0% |
| Numerical fraction of particles of less than 10 microns | 54% | 24% |

Aggregates comprising partly sintered or fused particles are formed.

Example 3

Example 2 is repeated with 0.4 kg of dioctyl phthalate (instead of 2 kg), with the proportion of plasticizer thus amounting to 1%. Visual evaluation of the spray-dried powder by comparison with the batch without plasticizer shows a significant reduction of dust formation.

Example 4

Dibutylphthalate was stirred into a polystyrene dispersion having a solids content of 50 percent by weight in an amount of 3 percent by weight of the polymer. The pure polystyrene had a Vicat softening point of 100° C. The dispersion was spray dried using an air inlet temperature of 160° C. and an air outlet temperature of 65° C. The polystyrene powder obtained is extensively dust-free. The powder grains clearly comprise sintered latex particles.

Example 5

A 50 percent aqueous dispersion of a terpolymer comprising 80 percent by weight of methyl methacrylate, 10 percent of acrylonitrile, and 10 percent of ethyl acrylate was stirred together with 3 percent of dioctylphthalate, by weight of the polymer. The Vicat softening point of the pure terpolymer was above 80° C. The dispersion was spray dried with an air inlet temperature of 160° C. and an air outlet temperature of 68° C. to give a non-dusting powder composed of sintered latex particles.

Example 6

A 41 percent aqueous dispersion of a copolymer of equal parts of methyl methacrylate and methacrylic acid, having a Vicat softening point above 100° C., was employed. 5 percent, by weight of the polymer, of polyethylene glycol having an average molecular weight of 3400 was stirred into the dispersion as a plasticizer for the polymer. The dispersion was then spray dried using an air inlet temperature of 160° C. and an air outlet temperature of 75° C. The powder obtaining is non-dusting and the powder grains clearly comprise sintered latex particles.

What is claimed is:

1. A method for making a spray dried emulsion polymer in the form of powder grains consisting essentially of aggregated latex particles, which method comprises spray drying an aqueous emulsion of a polymer having a Vicat softening point above 60° C. and separating the spray dried emulsion polymer grains from the air stream used in spray drying at an outlet temperature of 40° C. to 90° C., said emulsion containing a plasticizer which is compatible with said polymer, has a boiling point of at least 150° C., and has a melting point below said outlet temperature at which said powder grains are separated from said air stream, said outlet temperature being below that temperature at which said emulsion polymer would melt in the absence of said plasticizer.

2. A method as in claim 1 wherein said plasticizer has a boiling point above 200° C.

* * * * *